United States Patent

Wan

[11] Patent Number: 5,566,590
[45] Date of Patent: Oct. 22, 1996

[54] CRANK DEVICE

[76] Inventor: Joo S. Wan, 1001-32, Sadang 1 Dong, Dongjakgu, Seoul, Rep. of Korea

[21] Appl. No.: 273,127

[22] Filed: Jul. 14, 1994

[30] Foreign Application Priority Data

Jul. 14, 1993 [JP] Japan ................................ 5-174349

[51] Int. Cl.$^6$ ................................................ G05G 1/14
[52] U.S. Cl. ............................................. 74/594.3; 74/32
[58] Field of Search ........................... 74/594.3, 594.2, 74/594.7, 32

[56] References Cited

U.S. PATENT DOCUMENTS

| | | | |
|---|---|---|---|
| 558,516 | 4/1896 | Pedersen | 74/594.3 |
| 1,703,497 | 2/1929 | Noah | 74/32 |
| 1,818,313 | 8/1931 | Everts | 74/32 |
| 3,888,136 | 6/1975 | Lapeyre | 74/594.3 |
| 4,882,945 | 11/1989 | Trevizo | 74/594.3 |
| 5,207,119 | 5/1993 | Garneau | 74/594.3 |

Primary Examiner—Charles A. Marmor
Assistant Examiner—David Fenstermacher
Attorney, Agent, or Firm—Wenderoth, Lind & Ponack

[57] ABSTRACT

A crank device can produce a large torque without increasing the locus of the crank arm. The crank arm has first and second arms which are longitudinally slidably coupled together through a pinion. The second arm is formed with two sets of rack teeth on both sides of the pinion. The pinion has along its circumference a plurality of teeth which are adapted to alternately come into meshing engagement with the respective sets of rack teeth every time the crank arm makes a half turn in the same direction. Thus, the entire length of the crank arm alternately becomes maximum and minimum every time the crank arm turns by 180°. By applying a driving force to the crank arm when the length of the crank arm is maximum, it is possible to produce a large torque.

19 Claims, 14 Drawing Sheets

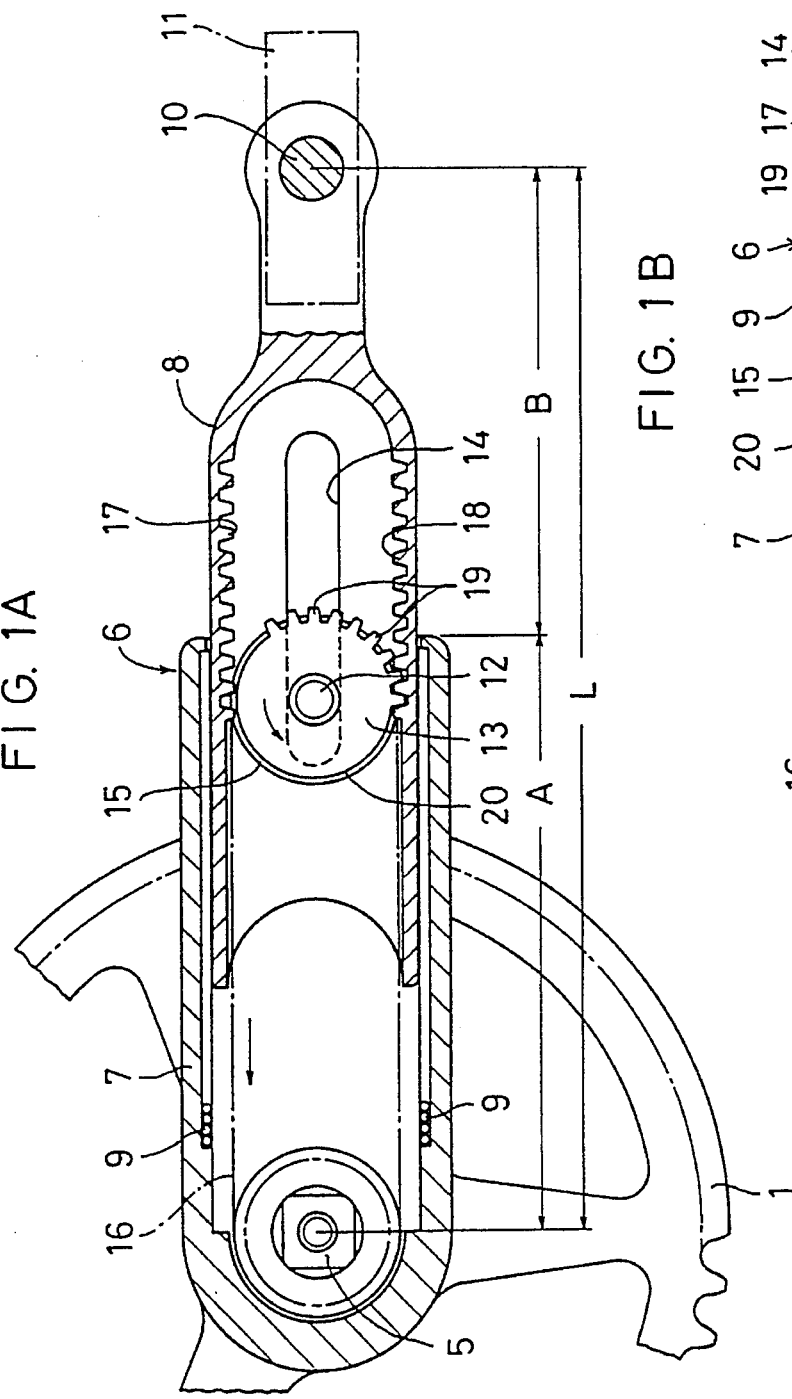
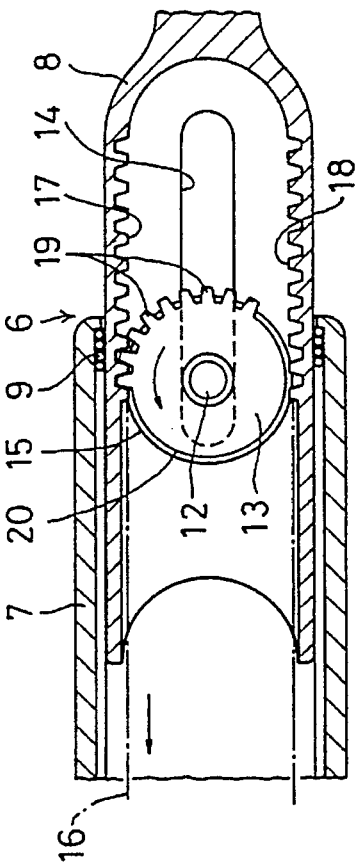

5,566,590

CRANK DEVICE

BACKGROUND OF THE INVENTION

This invention relates to a crank device for use in the crank-pedal mechanism of a bicycle or for use as a coupling member between a piston and the crankshaft of an automotive engine.

FIG. 4B shows a conventional crank device of this type. It has a crank arm 111 having one end thereof coupled to a rotary shaft 112. Driving force F is applied to the other end of the arm 111.

The arm 111 of this conventional crank device has a fixed length L', so that it makes a completely circular movement about the rotary shaft 112. Torque T is thus produced at the rotary shaft 112.

Let us now consider the crank-pedal mechanism of a bicycle. Force is applied to the pedal only while the pedal is moving down, i.e. only in a range about half the full one rotation cycle. In the other half of the cycle, the crank arm is rotated by inertia with no external force being applied.

Similarly, in case of an automotive engine, driving force acts on the crank arm not throughout the entire range of the rotation cycle of the crank arm but only while the piston is being accelerated by the combustion of the air-fuel mixture in the cylinder. At other times, the crank arm is rotated by inertia.

In order to produce as large torque T as possible with the conventional crank device shown in FIG. 4B, the length L' of the crank arm 111 has to be correspondingly large. But a long crank arm leads to an increase in the size of the entire crank device as well as its working space.

If the crank-pedal mechanism of a bicycle has such long crank arms 111, the rider will have a hard time exerting a force on the pedals because the turning radius of the pedals is very long and thus he has to move his feet along a correspondingly large circular path.

SUMMARY OF THE INVENTION

It is an object of this invention to provide a crank device that can produce a maximum torque for a predetermined force while keeping the locus of the crank arm to a minimum.

The crank device according to this invention comprises a crank arm made up of at least two arms longitudinally slidably coupled together, a rotary member coupled to the crank arm and adapted to rotate as the crank arm is turned, and a motion converting means for converting the rotary motion of the rotary member into a linear motion of one of the two arms, the motion converting means moving the one arm away from the other arm while the rotary member is making a first half turn in one direction and moving the one arm toward the other arm while the rotary member is making a second half turn in the one direction.

In the second arrangement, the driving connection between the rotary member and the crank arm is in effect disconnectable. The crank device has means for changing the angular position of the rotary member relative to the crank arm, while the driving connection between the rotary member and the crank arm is rendered ineffectual.

In the third arrangement, the connection between the motion converting means and the one arm is variable. The crank device further comprises means for changing the relative position between the motion converting means and the one arm.

In the fourth arrangement, the motion converting means comprises a pinion rotatable together with the rotary member, and two racks provided on the one arm so as to extend longitudinally of the one arm and located on opposite sides of the pinion, the pinion being formed with gear teeth on at least part of its circumference, so that the gear teeth are brought into engagement with one of the racks while the crank arm is making a first half turn and with the other of the racks while the crank arm is making a second half turn that follows the first half turn.

In the fifth arrangement, the motion converting means is a connecting member connecting the rotary member to the one arm, the connecting member being connected to the rotary member at a point offset from the center of rotation of the rotary member.

In the sixth arrangement, the motion converting means comprises a pinion mounted on the one arm so as to be rotatable and movable longitudinally of the one arm and formed with gear teeth on its circumference, two racks provided on the arms, respectively, and located on opposite sides of the pinion, and a transmission member for converting the rotary motion of the rotary member into a linear motion of the pinion by urging the central portion of the pinion in a longitudinal direction of the arms, the gear teeth formed on the circumference of the pinion meshing with both racks.

The crank device in the seventh arrangement further comprises a rotary element provided at any location along the length of the crank arm and adapted to rotate as the crank arm turns, the rotary member being drivingly coupled to the rotary element, whereby the rotary member is rotated by the crank arm through the rotary element.

When the crank arm turns and the rotary member associated therewith makes a half turn, the arms of the crank arm are moved away from each other in a straight line by the motion converting means. The length of the crank arm thus increases. When the crank arm makes another half turn, the rotary motion of the rotary member is now converted into the linear motion in the opposite direction. In other words, the arms are now moved toward each other, so that the entire length of the crank arm decreases.

By setting the locus of the crank arm so that the driving force is applied to the pedal while the crank arm is within the angular range of ±90° from the point at which the entire length of the crank arm becomes maximum and so that the crank arm will move by inertia within the angular range of ±90° from the point at which its entire length becomes minimum, it is possible to produce a large torque because the driving force is applied while the length of the crank arm is large.

Since the length of the crank arm alternately becomes maximum and minimum at the angular intervals of 180°, the locus of the crank arm has substantially the same area as the locus of a conventional crank arm, so that it can work in a sufficiently small space.

In the second arrangement, it is possible to change the connecting point between the motion converting member connected with the rotary member and the crank arm by changing the angular position of the rotary member.

In the third arrangement, it is possible to change the maximum and minimum lengths of the crank arm by changing the position of the motion converting member relative to one of the arms. Thus, with these arrangements, it is possible to freely change the shape and size of the locus of the crank arm so that the torque and/or rotating speed will be maximal.

In the fourth arrangement, while the crank arm is making a first half turn, the gear teeth formed on the pinion mesh with the teeth of one of the racks, moving the rack in such a direction that the two arms forming the crank arm move away from each other. While the crank arm is making another half turn that follows the first half turn, the teeth of the pinion are now brought into engagement with the other rack teeth, thus moving the arms toward each other. The entire length of the crank arm thus decreases.

In the fifth arrangement, when the rotary member rotates, the connecting member and one of the arms reciprocate in the axial direction within the range which is twice the amount of eccentricity between the center of rotation of the rotary member and the point at which the connecting member is connected to the rotary member, so that the crank arm is extended and shrunk.

In the sixth arrangement, rotary motion of the rotary member is transmitted to the pinion through the link member, so that the center of the pinion moves in a longitudinal direction of the arm. Since the teeth formed on the pinion mesh with the rack teeth formed on both arms, the movable one of the arms are moved at twice the speed of the pinion center with respect to the other fixed arm. Thus, in this arrangement, the difference between the maximum length and the minimum one of the crank arm is doubled compared with the fourth and fifth arrangements.

In the seventh arrangement, the driving force may be transmitted to the rotary member through any member that is rotatable together with the crank arm. This increases the freedom of design of the crank device.

Other features and objects of the present invention will become apparent from the following description made with reference to the accompanying drawings, in which:

BRIEF DESCRIPTION OF THE DRAWINGS

FIG. 1A is a vertical sectional front view of a crank device of a first embodiment;

FIG. 1B is a sectional view showing its operational state;

DETAILED DESCRIPTION OF THE PREFERRED EMBODIMENTS

Figure 2:
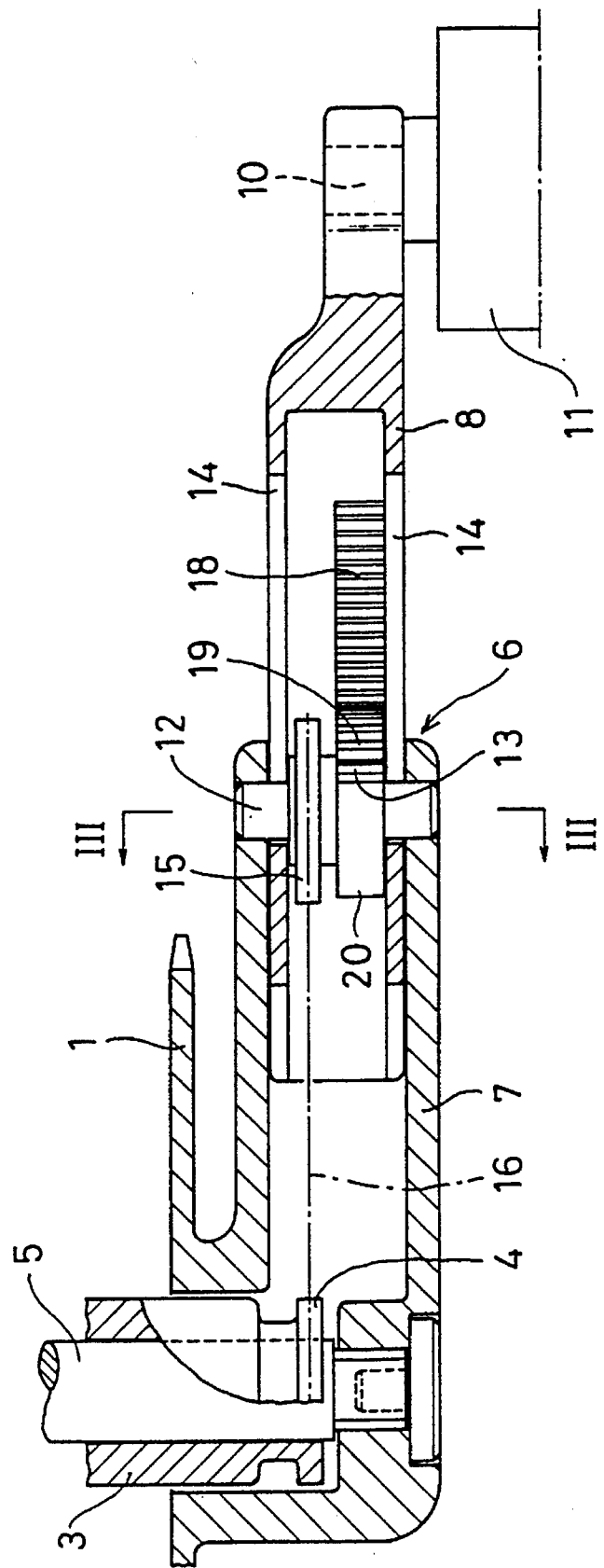
FIG. 2 is a cross-sectional plan view of the same.
Figure 3:
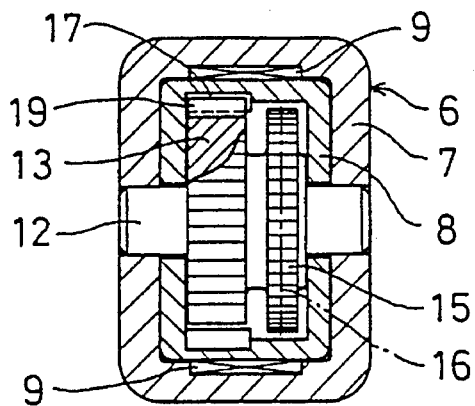
FIG. 3 is a sectional view taken along line III—III of FIG. 2.

FIGS. 1–3 show the first embodiment of the crank device of this invention, which is used in the crank-pedal mechanism of a bicycle.

In FIGS. 1 and 2, numeral 1 designates a sprocket meshing with the drive chain of the bicycle. A shaft 3 is fixed to the bicycle frame. A pulley 4 is a fixed transmission member non-rotatably fixed to the fixed shaft 3. A crank arm 6 has its one end coupled to a rotary shaft 5 which is coupled to the sprocket 1.

The crank arm 6 comprises a hollow first arm 7 and a second arm 8 slidably inserted in the first arm 7. The first arm 7 has its one end mounted on the rotary shaft 5. Numerous needle bearings 9 are set in the inner side faces of the first arm 7 so that the second arm 8 is guided so as to be smoothly slidable in the first arm 7. The second arm 8 carries at its one end a pedal 11 through a shaft 10.

As shown in FIGS. 1 to 3, the first arm 7 and the second arm 8 are coupled together through a pinion shaft 12 having both ends thereof supported on the side walls of the first arm 7. A pinion 13 is rotatably mounted on the pinion shaft 12. Elongated holes 14 are formed in the side walls of the second arm 8 through which the pinion shaft 12 extends.

A pulley 15 is integrally fixed to one side of the pinion 13. A wire 16 is wound around the pulley 15 and the fixed pulley 4 to rotate the pulley 15. The wire 16 may be replaced by a belt or a chain. When the crank arm 6 is turned about the rotary shaft 5, tension is produced between the pulleys 4 and 15, so that the pulley 15 (and thus the pinion 13) is rotated by an amount corresponding to the turning angle of the crank arm.

On the other hand, rack teeth 17 and 18 are formed opposite the pinion 13 on the upper and lower inner side faces of the second arm 8. The rack teeth 17 and 18 are arranged longitudinally at equal pitches and opposite to each other.

The pinion 13 has teeth 19 provided along about half its circumference and adapted to mesh with the rack teeth 17 and 18. The other half of the circumference of the pinion 13 is a smooth circular surface 20 which does not mesh with the rack teeth 17 and 18. When the pinion 13 makes a half turn clockwise or counterclockwise, the teeth 19 are brought into engagement with the upper or lower rack teeth 17 or 18. The number of rack teeth 17 or 18 is determined so that while the pinion 13 is making the half turn in either direction, the teeth 19 will be kept in engagement with either the rack teeth 17 or 18.

When, in the state of FIG. 1, the pedal 11 is pushed down with a force F, the crank arm 6 will turn clockwise, producing tension in the direction of the arrow on the wire 16 wound around the pulleys 4 and 15. This tension causes the pinion 13 to rotate counterclockwise. The teeth 19 are thus brought into engagement with the lower rack teeth 18, moving the rack teeth 18 rightwards.

The second arm 8 is thus pushed out of the first arm 7, so that the length L of the entire crank arm 6 increases.

When the crank arm 6 turns to the position shown in FIG. 1A, the length L of the crank arm 6 becomes maximum. In this position, the teeth 19 will so on disengage from the lower rack teeth 18.

When the crank arm 6 is further turned downward from this position, as shown in FIG. 1B, the teeth 19 are now brought into engagement with the upper rack teeth 17, urging them leftwards. The second arm 8 is thus moved leftwards into the first arm 7. The length L of the entire crank arm 6 will decrease.

Figure 4A:
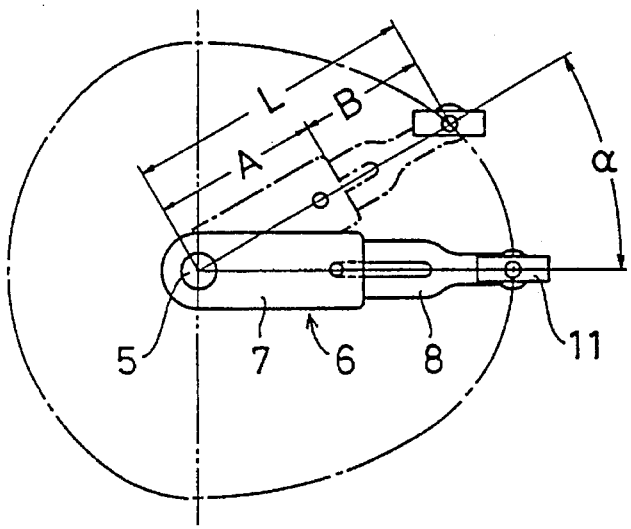
FIG. 4A schematically shows the locus of the crank arm of the embodiment.

As a whole, the crank arm 6 is turned following a path as schematically shown in FIG. 4A. Namely, the free end of the crank arm 6 follows a substantially elliptic path whose radius is the maximum in the range where the driving force is being applied to the pedal 11 and becomes the minimum in the range where the pedal is moving by inertia.

The torque T applied to the rotary shaft 5 is given by T=F×(A+B)·cosα (where A is the length of the first arm 7, B is that of the second arm 8, and α is the turning angle of the crank arm 6). Since the crank arm 6 of this invention is turned following the elliptic-like path as shown in FIG. 4A, while the force F is being applied to the pedal, the torque T increases with the increasing length L. Thus, the maximum torque T attainable with the crank device of the present invention is larger than the torque attainable with the conventional crank device with a crank arm having a fixed length L' by an amount equal to F×(L−L')·cosα.

Figure 4B:
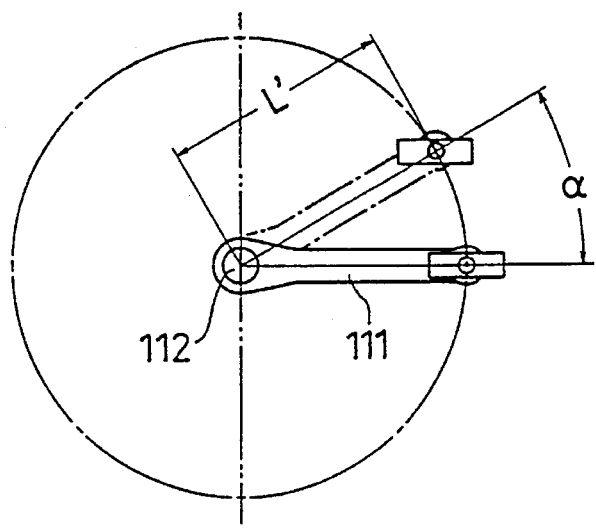
FIG. 4B schematically shows the locus of a conventional crank arm.
Figure 5:
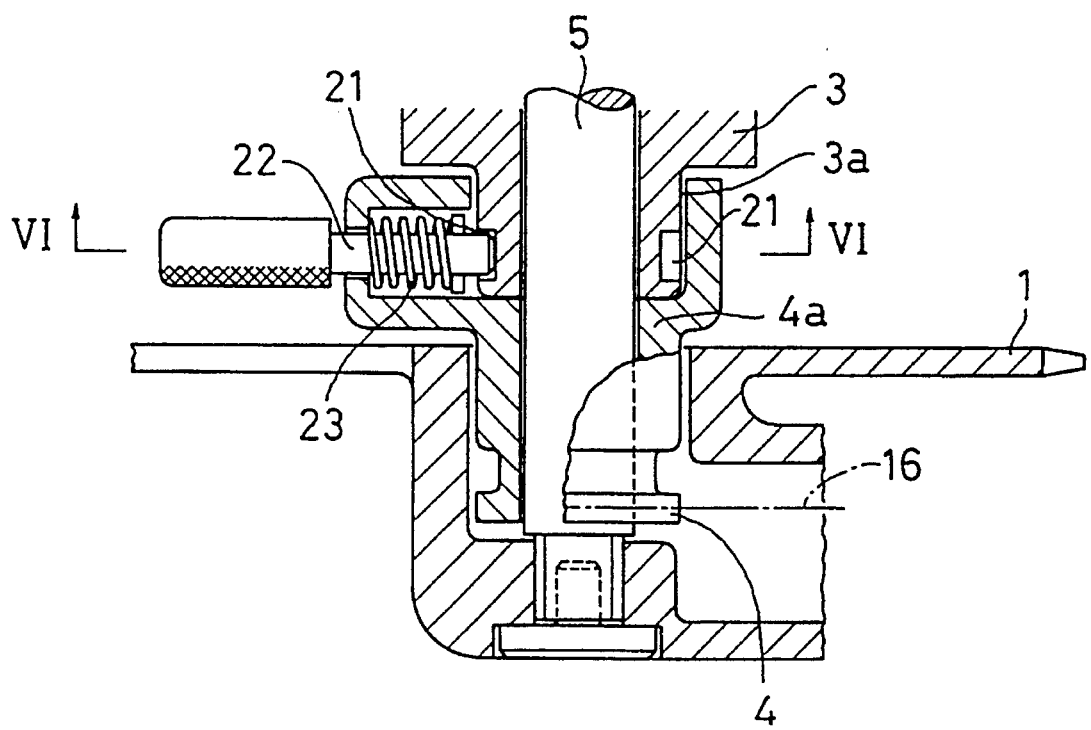
FIG. 5 is a sectional view of a second embodiment.
Figure 6:
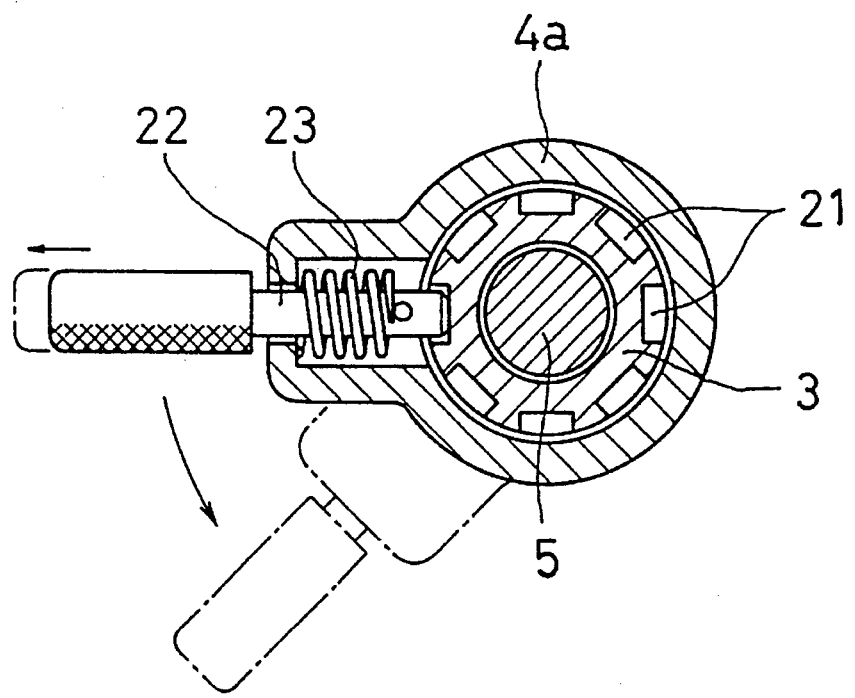
FIG. 6 is a sectional view taken along line VI—VI of FIG. 5.

While the crank arm 6 makes one rotation, the length L becomes maximum only temporarily and is kept short throughout the return phase. Thus, its locus as a whole is not very large compared with the locus of the fixed type of crank arm shown in FIG. 4B. In particular, in the arrangement in which the crank arm length becomes maximum when the crank arm is in the horizontal position, the vertical diameter of the locus of the crank arm is no different from that of the conventional crank arm. Thus, the rider can control the pedals 11 as easily as with a bicycle with a conventional crank arm.

FIGS. 5 through 8 show the second embodiment.

In this embodiment, the fixed shaft 3 and the pulley 4 are provided at the supporting point of the crank arm 6 so as to be separable from each other. The fixed shaft 3 has an end portion 3a received in a pulley shaft 4a which is, in this embodiment, integral with the pulley 4. A plurality of grooves 21 are formed in the circumferential surface of the end portion 3a of the shaft 3, circumferentially spaced from one another at predetermined angular intervals. The pulley shaft 4a carries a stopper pin 22 urged toward one of the grooves 21 by a spring 23. By inserting the stopper pin 22 in a predetermined one of the grooves 21, the pulley 4 can be set in a predetermined angular position relative to the fixed shaft 3.

Figure 7A:
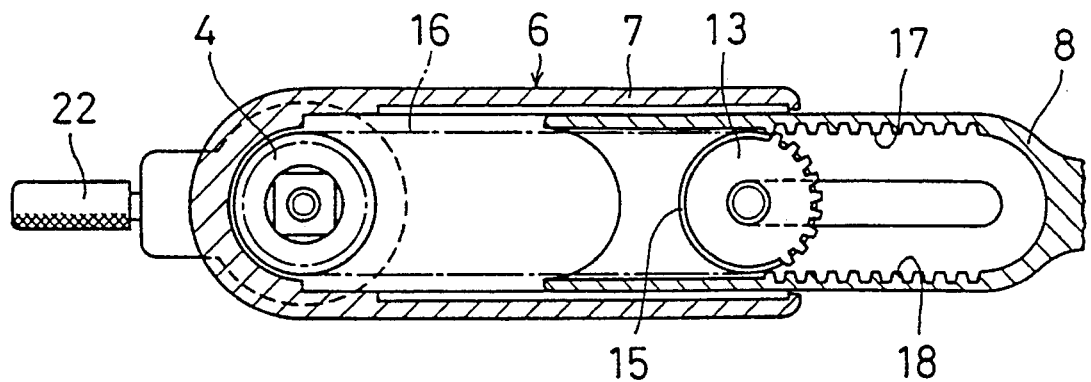
FIGS. 7A and 7B are sectional views explaining the operation of the second embodiment.
Figure 7B:
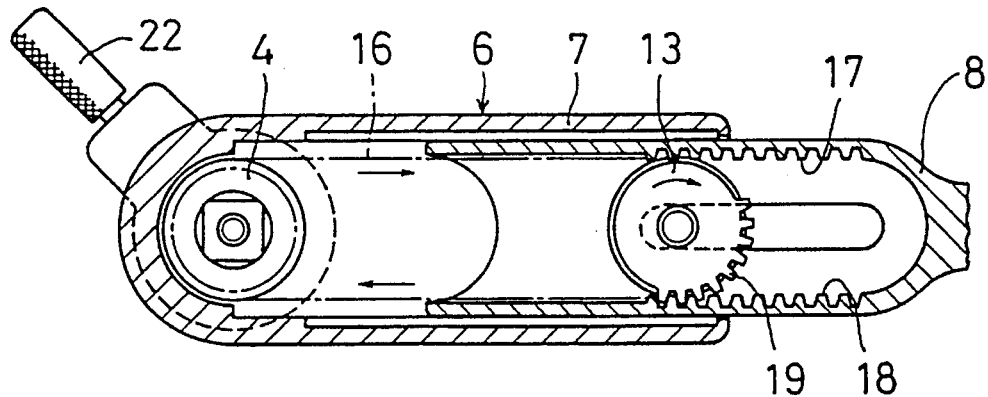
Figure 8:
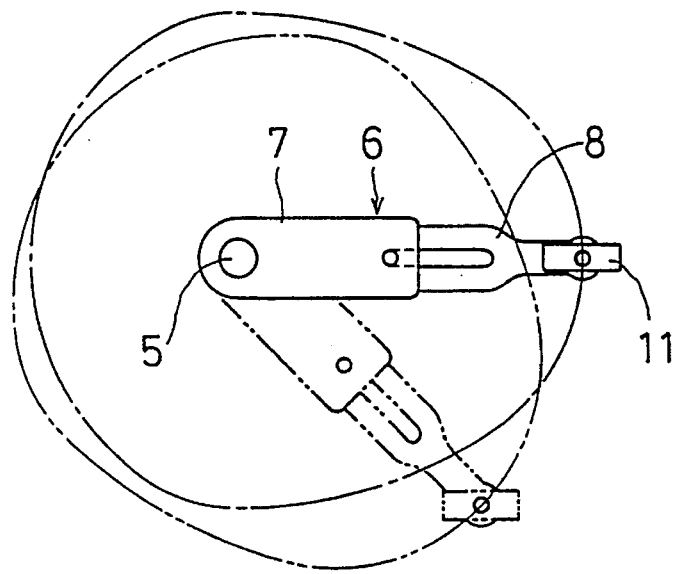
FIG. 8 is a view showing different loci of the same.

In this arrangement, if the angular position of the pulley 4 relative to the fixed shaft 3 is changed, as shown in FIGS. 7A and 7B, the pulley 15 and the pinion 13 are rotated by the tension of the wire 16, so that the meshing point between the pinion 13 and the rack teeth 18 changes. The crank arm 6 is thus extended or shrunk. Thus, if the crank arm 6 is rotated from the state shown in FIG. 7B, its length L becomes maximum and minimum at different points in the rotation cycle than when the crank arm is rotated from the position shown in FIG. 7A. In other words, according to the position of the stopper pin 22, the phase of the locus of the crank arm 6 changes as shown in FIG. 8. Thus, by adjusting the angular position of the pulley 4 relative to the fixed shaft 3 by operating the stopper pin 22, it is possible to change the phase of the locus of the crank arm according to the physical dimensions of the rider or to his liking so that he can transmit the driving force to the pedals with the best timing.

Figure 9:
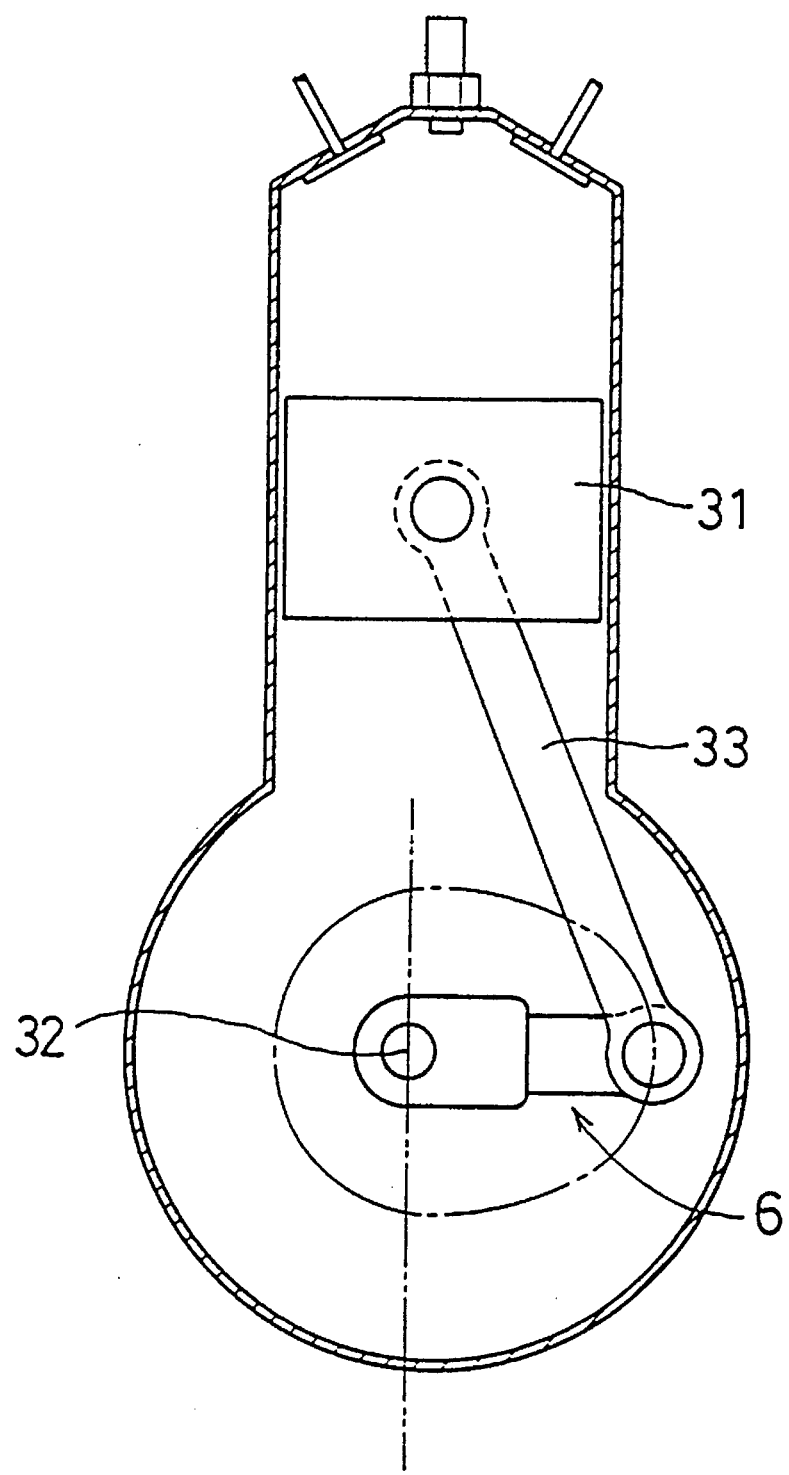
FIG. 9 is a view of a third embodiment.

FIG. 9 shows the third embodiment. The crank device of this embodiment is used as a coupling between a rod 33 coupled to a piston 31 of an automotive engine and its crankshaft 32.

In this case, the crank arm 6 is so arranged that its length increases while the piston 31 is being accelerated due to the combustion of air-fuel mixture in the cylinder. With this arrangement, it is possible to markedly increase the torque transmitted from the piston to the crankshaft 32 through the crank arm 6.

By using the crank arm of this invention in the drive train of an automotive engine, it becomes possible to transmit the engine output with the highest efficiency. A car equipped with such a crank arm will show especially high performance when climbing a slope or during long-distance travel.

Figure 10:
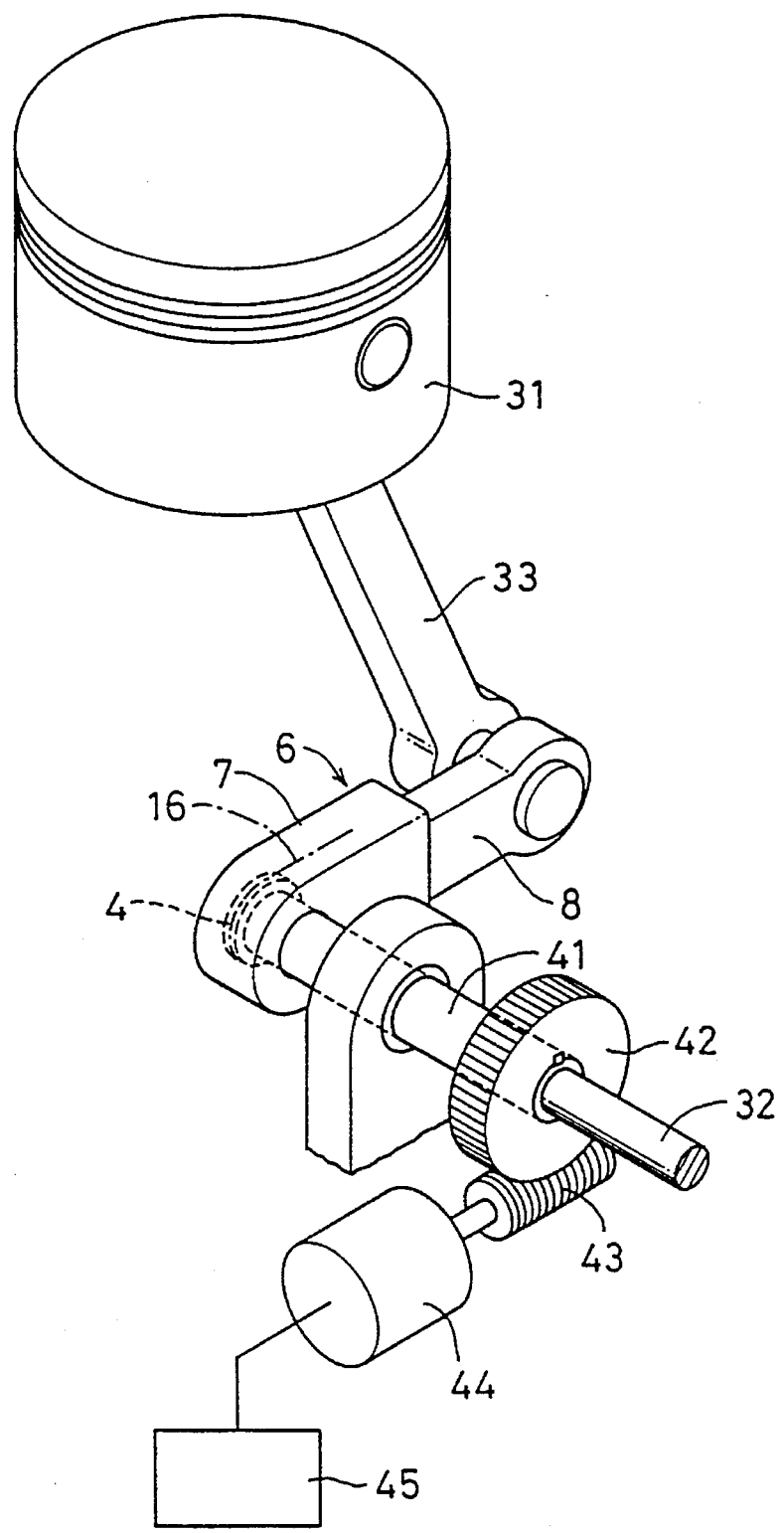
FIG. 10 is a perspective view of a fourth embodiment.

FIG. 10 shows the fourth embodiment. The crank device of this embodiment is also used in an automotive engine and has means for changing the angular position of the pinion.

In FIG. 10, numeral 41 designates a fixed shaft extending through the crank arm 6 and coupled to the pulley 4, which is mounted on one end of the fixed shaft 41. A worm wheel 42 is mounted on the other end of the fixed shaft 41. A worm 43 driven by a servo motor 44 meshes with the worm wheel 42.

In this arrangement, by actuating the servo motor 44 by an on-board computer 45, the worm 43 and the worm wheel 42 will rotate and thus the pulley 4 coupled to the fixed shaft 41 and the pulley coupled to the pinion will also rotate, so that the meshing point between the pinion and the rack teeth will change. The crank arm 6 is thus extended or contracted.

By adjusting the points at which the length of the crank arm 6 becomes maximum and minimum, the locus of the crank arm 6 can be optimized with respect to the stroke of the piston 31 so that the maximum torque can be produced with utmost efficiency. Also, by changing the locus of the crank arm, it is possible to change the stroke of the piston 31 and thus the compression ratio of air-fuel mixture. This makes it possible to increase the engine output.

Figure 11:
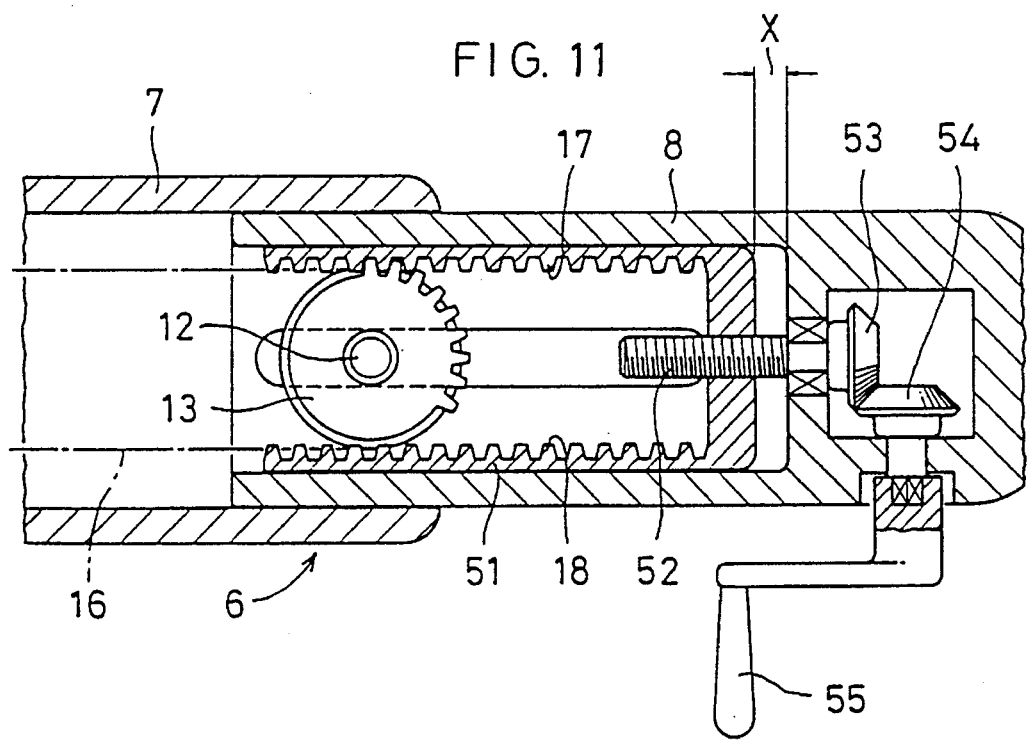
FIG. 11 is a sectional view of a fifth embodiment.

FIG. 11 shows the fifth embodiment.

This embodiment is the same as the other embodiments in that the pinion 13 meshes with the rack teeth 17 and 18 but differs in that the rack teeth 17, 18 are formed on a sleeve 51 slidably inserted in the second arm 8 and that a threaded shaft 52 for feeding the sleeve 51 extends through the end face of the sleeve 51.

A control handle 55 is coupled to the end of the threaded shaft 52 via bevel gears 53, 54. By turning the handle 55, the threaded shaft 52 will turn and the sleeve 51 will slide in either direction, changing the distance X between rack teeth 17, 18 and the second arm 8.

By changing the distance X, the maximum and/or minimum value of the arm length will vary. Thus, it is possible to adjust the size of the locus of the crank arm.

Figure 12:
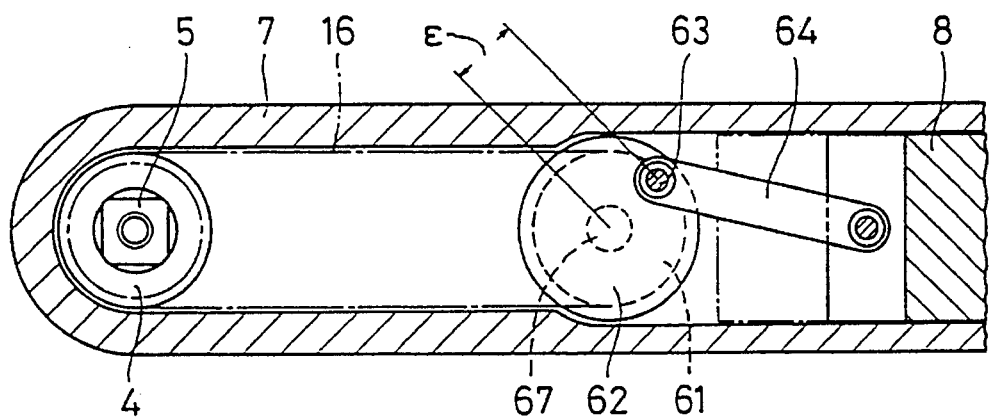
FIG. 12 is a vertical sectional front view of a sixth embodiment.
Figure 13:
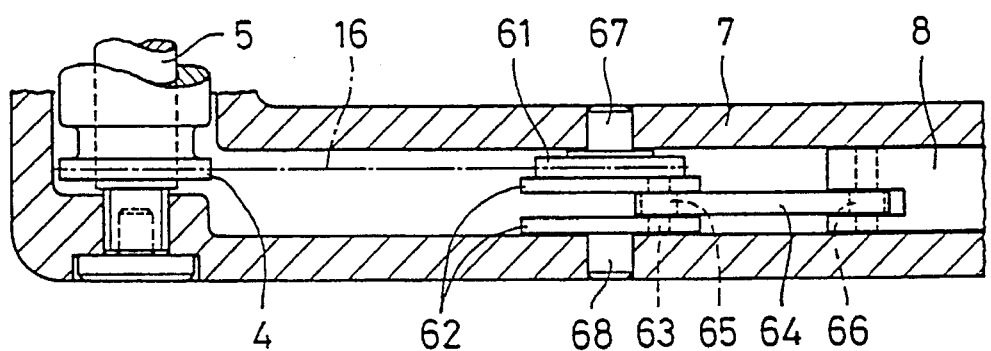
FIG. 13 is cross-sectional plan view of the same.

Next, FIGS. 12 and 13 show the sixth embodiment, in which the first arm 7 and the second arm 8 are coupled together by means of a crank mechanism.

The crank mechanism comprises a pulley 61, discs 62 arranged parallel to the pulley 61, a pin 63 coupling the pulley 61 and the discs 62 together, and a connecting member in the form of a rod 64 connected at one end to the pin 63 via a bearing 65 and at the other end to the end of the second arm 8 through a bearing 66.

The pulley 61 and the discs 62 are rotatably supported on the side walls of the first arm 7 through shafts 67 and 68, respectively. The pin 63 is offset from the axis of the shafts 67 and 68 by a distance ϵ.

In this arrangement, when the pulley 61 and the discs 62 rotate, the crank arm 6 is moved substantially back and forth, so that the second arm 8 will reciprocate relative to the first arm 7 within the range of a distance equal to the eccentricity ϵ multiplied by two. Thus, the entire length of the crank arm 6 increases and decreases within this range.

Figure 14:
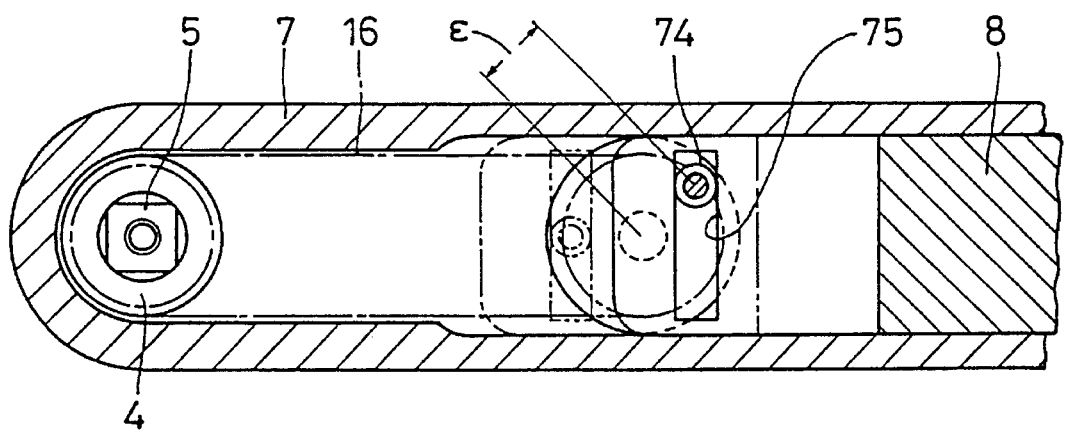
FIG. 14 is a vertical sectional front view of a seventh embodiment.
Figure 15:
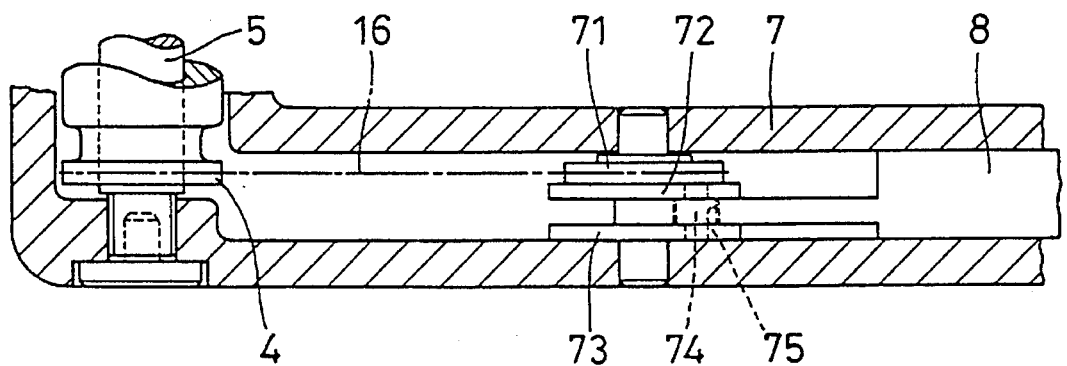
FIG. 15 is a cross-sectional plan view of the same.

FIGS. 14 and 15 show the seventh embodiment, in which a pair of discs 72, 73 are mounted to one side of a pulley 71. Between the discs 72 and 73 are provided a pin 74 that is received via a bearing in a vertically elongate hole 75 formed in the end of the second arm 8. The pin 74 is offset from the axis of the pulley 71 by a distance ϵ. Thus, when the pulley 71 rotates, the second arm 8 reciprocates.

Figure 16:
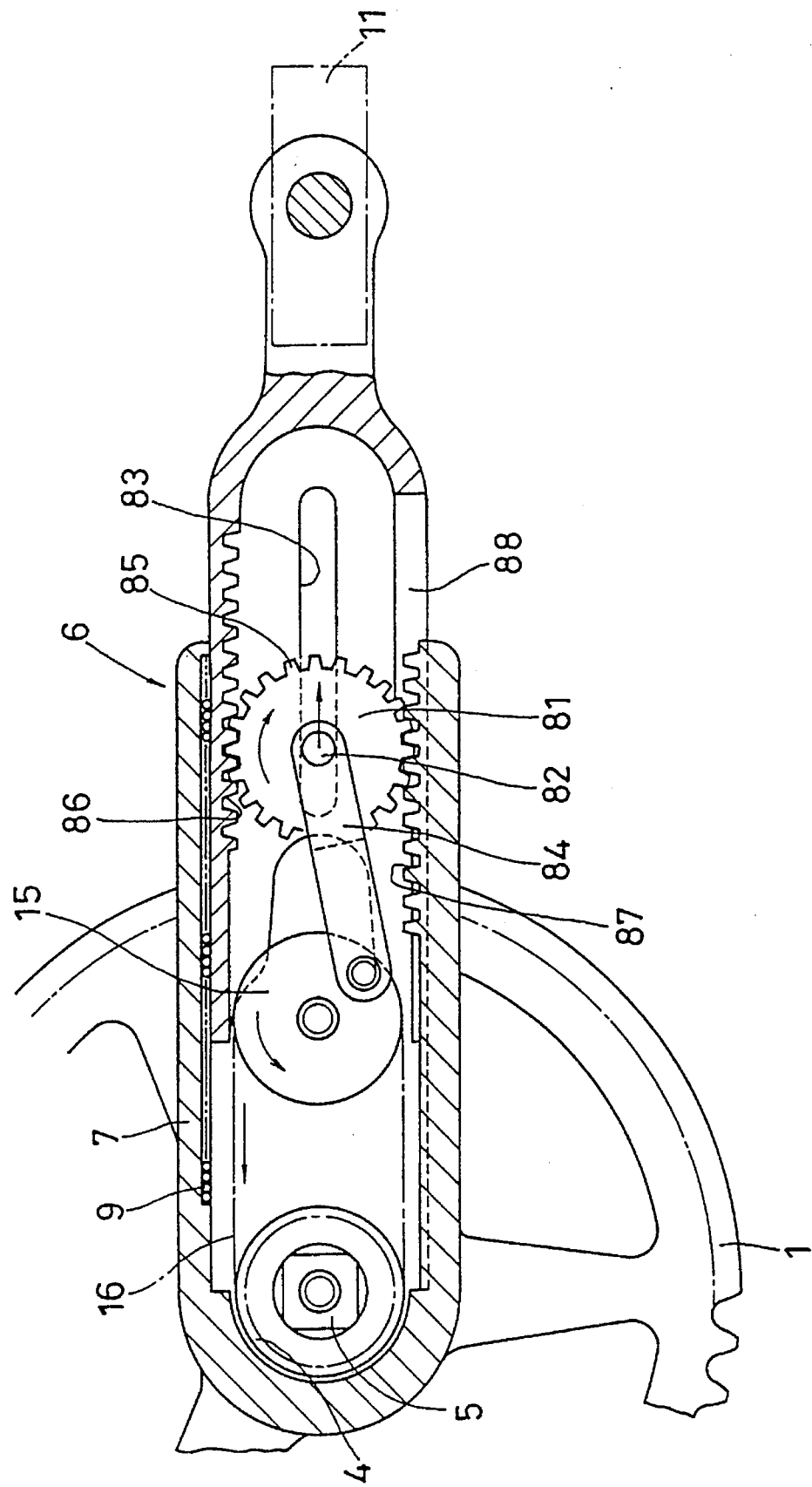
FIG. 16 is a vertical sectional front view of an eighth embodiment.
Figure 17:
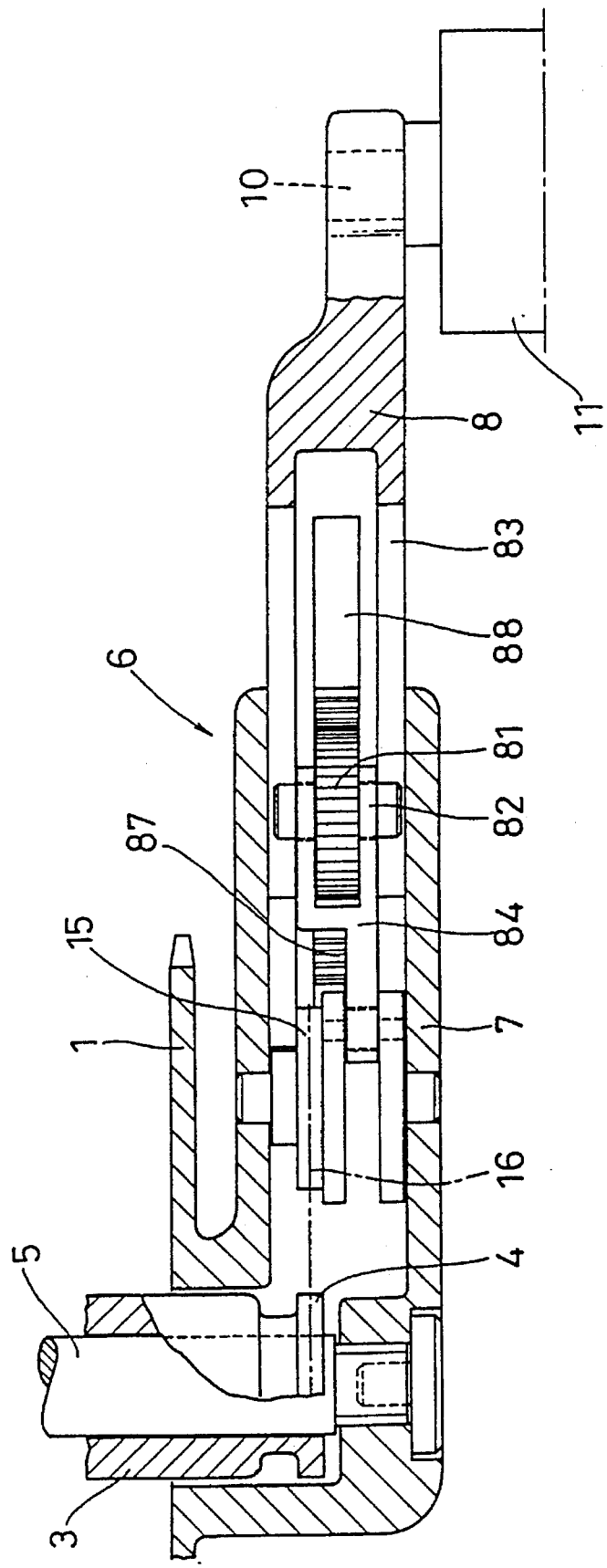
FIG. 17 is a cross-sectional plan view of the same.
Figure 18:
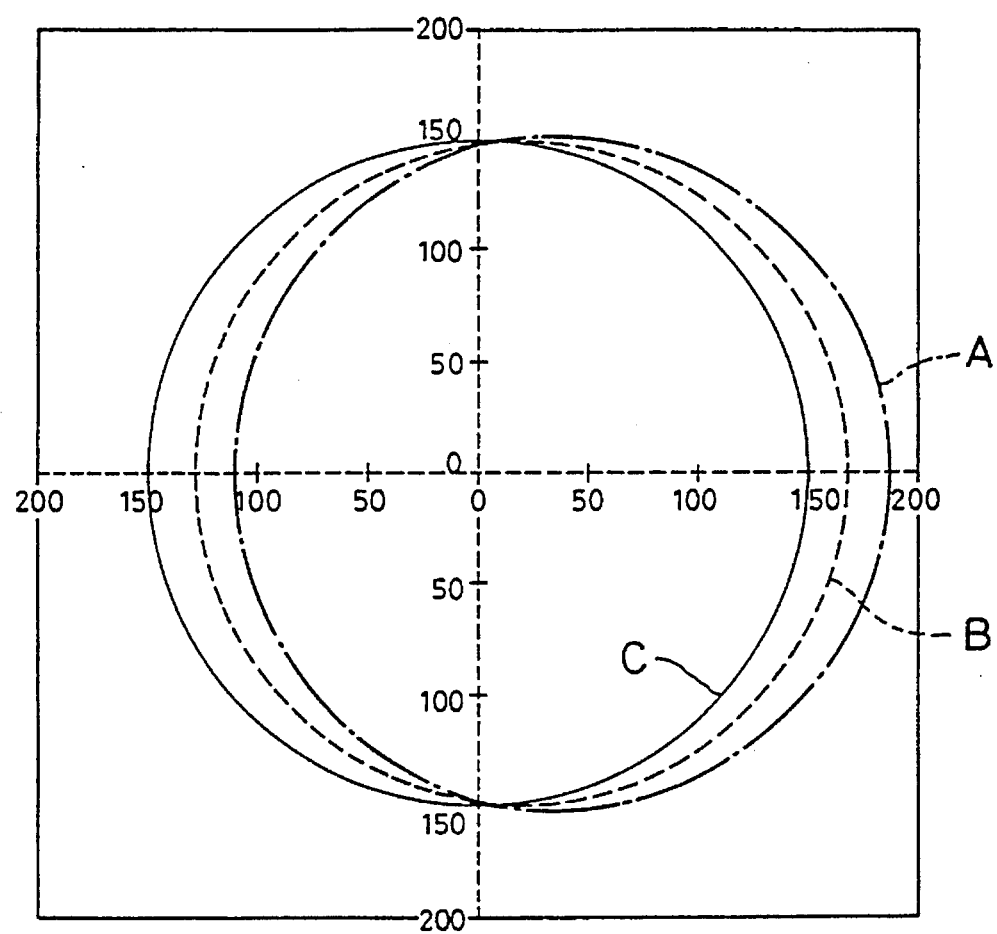
FIG. 18 is a view showing the loci of different crank arms.

FIGS. 16 through 18 show the eighth embodiment.

In this embodiment, the pulley 15, which is rotated by the wire 16 when crank arm 6 turns, is separate from a pinion 81. The pinion 81 has a central shaft 82 received in elongate holes 83 formed in the side walls of the second arm 8 and supporting the pinion 81 so that it is movable axially of the arm 6.

A transmission member 84 couples the pulley 15 at an eccentric point with the pinion 81 at its center shaft 82. When the pulley 15 turns, the transmission member 84 causes the pinion 81 to reciprocate longitudinally of the second arm 8.

The pinion 81 is formed with engaging teeth 85 over its entire circumference. The teeth 85 mesh with rack teeth 86 formed on the inner upper surface of the second arm 8. The pinion 81 and the teeth 86 make up first and second motion transmitting components of a motion converter whose function is described below. The second arm 8 is formed with a long groove 88 in its lower surface. Rack teeth 87 formed on the first arm 7 protrude into the second arm 8 through the groove 88 and mesh with the teeth 85 of the pinion 81 at all times.

When the crank arm 6 is turned, the pulley 15 rotates together, so that the central shaft 82, coupled to the transmission member 84, and the pinion 81 reciprocate in the longitudinal direction of the crank arm. Because the teeth 85 of the pinion 81 are meshing with both the rack teeth 87 of the first arm 7 and the rack teeth 86 of the second arm 8, and because the first arm 7 is fixed, the pinion 81 turns in such a direction that the second arm 8 is moved toward to and away from the first arm 7.

While the center shaft 82 is being moved by the rotation of the pulley 15 in either direction at a given speed, the rack teeth 86 of the second arm 8 are moved at twice the speed of the center shaft 82. This is because the peripheral speed of the pulley 81 at a point meshing with the stationary rack teeth 87 of the first arm 7 is zero and thus the peripheral speed of the pulley 81 at a point meshing with the rack teeth 86 of the second arm 8 is twice the speed of the center of the pinion 81, i.e. the center shaft 82. Thus, the second arm 8 is also moved at about twice the speed of the center shaft 82 of the pinion 81.

The second arm 8 moves not only at twice the speed of the pulley. It also moves twice the distance of the pulley. In other words, in this embodiment, the entire length of the crank arm 6 changes about twice the amount attainable with the device of the first, sixth or seventh embodiment, provided that their pulleys and pinions are of the same dimensions and shapes. FIG. 18 shows the loci of the crank arms of the eighth and sixth embodiments and a conventional crank arm. As shown in this figure, the locus (b) of the sixth embodiment is offset rightwardly from the locus (c) of the conventional crank arm. The locus (a) of the eighth embodiment is offset further right from the locus (b). If the locus (a) is compared with the locus (c), the former is remarkably offset rightwards from the latter.

Figure 19:
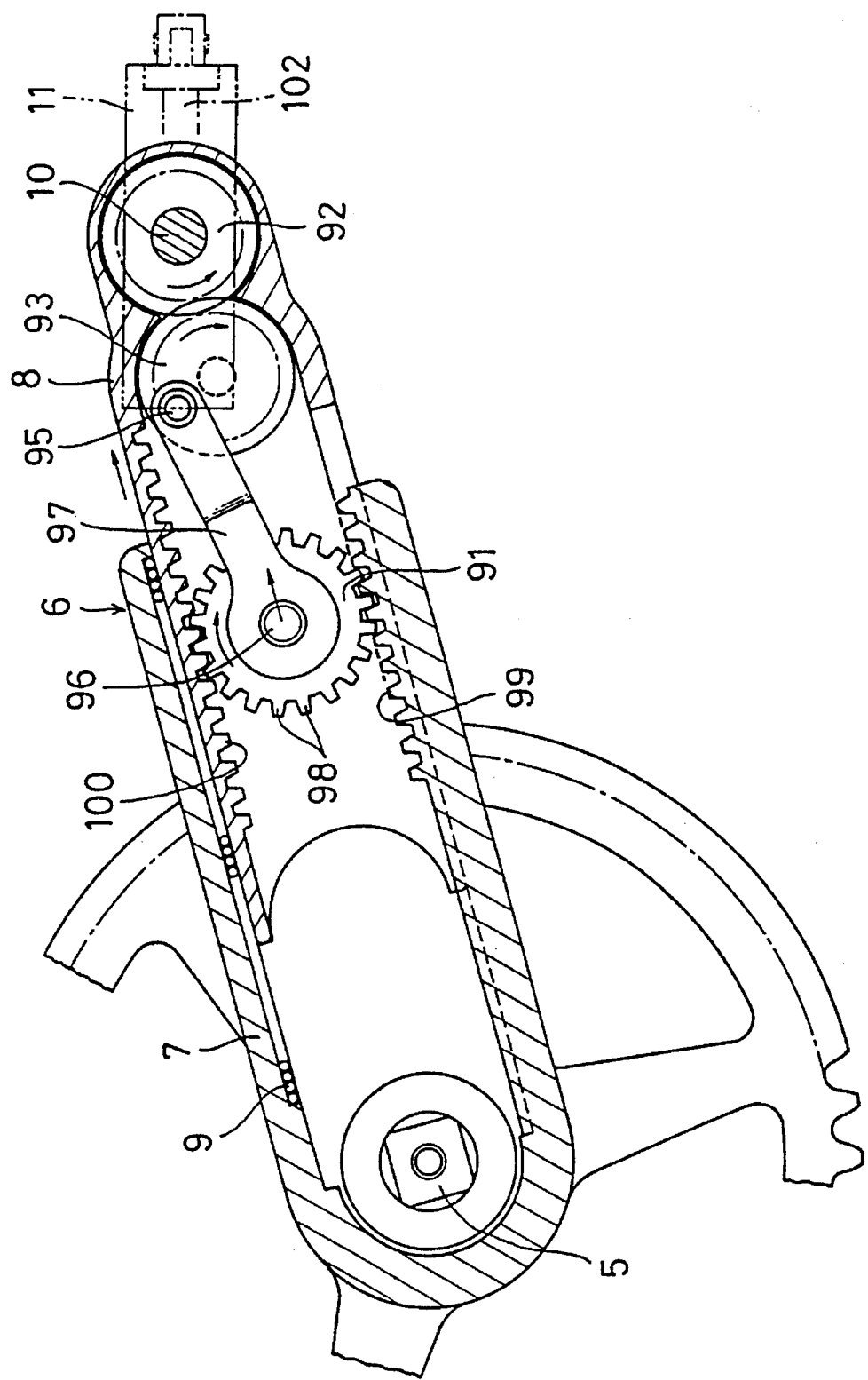
FIG. 19 is a vertical sectional view of a ninth embodiment.
Figure 20:
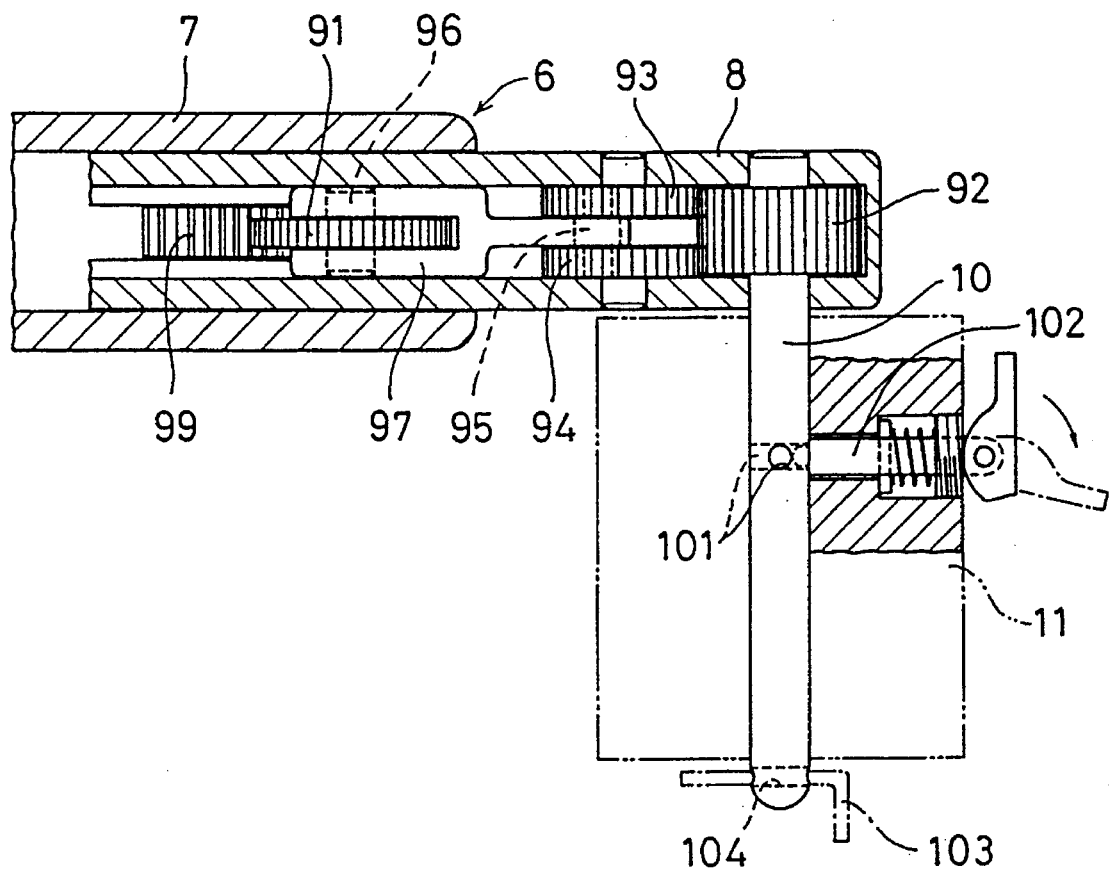
FIG. 20 is a cross-sectional view of the same.

FIGS. 19 and 20 show the ninth embodiment. In this embodiment, a turning force is applied to a pinion 91 by means, of the pedal mounting shaft 10 mounted on the free end of the crank arm 6.

The pedal mounting shaft 10 turns when the rider steps on the pedal and turns the crank arm 6. The shaft 10 carries a gear 92. The pedal, shaft 10 and gear 92 thus serve as a transmission having the same function as the pulley 4 and wire 16 in the previous embodiments.

The gear 92 meshes with a rotary member in the form of a pair of gears 93, 94 mounted in the second arm 8. A pin 95 is secured to the gears 93, 94 at a point offset from their rotational axis. The pin 95 is coupled to a center shaft 96 of the pinion 91 through a transmission member 97.

Similarly to the eighth embodiment, the pinion 91 (first motion transmitting component) provided with gear teeth 98 over its entire circumference. The teeth 98 are in engagement with both rack teeth 99 and 100 (second motion transmitting component) formed on the first arm 7 and the second arm 8, respectively.

A plurality of positioning holes 101 are formed at predetermined intervals in the circumferential surface of the pedal mounting shaft 10. The pedal 11 carries on its one side a stopper pin 102. The pedal mounting position is established by inserting the pin 102 in one of the positioning holes 101. For such positioning, the shaft 10 is turned by inserting a wrench 103 into a wrench hole 104 formed in the end of the shaft 10.

In this arrangement, when the crank arm 6 is turned, the pedal mounting shaft 10 rotates, thus turning the gears 93 and 94. The rotation of the gears 93 and 94 transmitted through the link member 97 to the center shaft 96 of the pinion 91, thus pushing the shaft 96 in a longitudinal direction of the arm 6. Since the pinion 91 meshes with the rack teeth 99, 100, the second arm is moved longitudinally relative to the first arm 7, so that the entire length of the crank arm 6 increases or decreases.

By withdrawing the stopper pin 102 from one positioning hole 101 and reinserting it in another hole 101, the angular position between the pedal and the pedal mounting shaft 10 changes. In this way, it is possible to change the points at which the length of the crank arm 6 becomes maximum and minimum.

In this embodiment, a turning force is applied to the pinion 91 from the pedal mounting shaft 10. But the pinion 91 may be driven from any other part of the crank arm 6 that rotates when the crank arm turns.

In any of the above-described embodiments, the crank arm 6 is made up of the first arm 7 and the second arm 8. However, the crank arm may comprise three or more arms slidably coupled together by means of pinions and rack teeth. Use of more than two arms makes it possible to change the length of the crank arm within a wider range and thus to produce a larger torque.

The turning movement of the crank arm 6 may be transmitted to the pinion 13 not through the pulleys 4 and 15 and the wire 16 but through any other gear train or transmission mechanism.

What is claimed is:

1. A crank mechanism comprising: a rotary shaft rotatable about the longitudinal axis thereof; a crank arm fixed to said rotary shaft so as to rotate therewith, said crank arm comprising a first arm portion having one end fixed to said rotary shaft, and a second arm portion mounted to said first arm portion so as to be slidable relative to said first arm portion; a rotary member rotatably mounted to said crank arm so as to be rotatable relative to said crank arm; transmission means for rotating said rotary member relative to said crank arm as said crank arm is turned about the longitudinal axis of said rotary shaft; and motion converting means integrated with said rotary member for moving said second arm portion toward said first arm portion while said rotary member is rotating a first half of one full rotation in one direction and for moving said second arm portion away from said second arm portion while said rotary member is rotating the second half of said one full rotation in said one direction, said motion converting means comprising a first motion transmitting component coupled to said rotary member, and a second motion transmitting component engaging said first motion transmitting component during the entire time said rotary member is making said one full rotation.

2. A crank mechanism as claimed in claim 1, and further comprising means for changing the angular position of said rotary member relative to said crank arm while said crank arm is rotationally stationary.

3. A crank mechanism as claimed in claim 2, and further comprises means for changing the relative position between said motion converting means and said second arm portion of said crank arm while said crank arm is rotationally stationary.

4. A crank mechanism as claimed in claim 2, wherein said motion converting means comprises a pinion integrated with said rotary member so as to rotate therewith, and two racks extending along said second arm portion on opposite sides of said pinion, respectively, said pinion having gear teeth on at least part of its circumference, said gear teeth being in engagement with one of said racks while said crank arm is rotating a first half turn about said longitudinal axis and with the other of said racks while said crank arm is rotating the second half turn that follows said first half turn.

5. A crank mechanism as claimed in claim 2, wherein motion converting means includes a connecting member connecting said rotary body to said second arm portion, said connecting member being connected to said rotary member at a point offset from the center of rotation of said rotary member.

6. A crank mechanism as claimed in claim 2, wherein said first motion transmitting component of said motion converting means comprises a pinion mounted on said second arm portion so as to be rotatable relative to and movable longitudinally of said second arm portion, said pinion having gear teeth on its circumference, and said second motion transmitting component of said motion converting means comprises a first rack located on said second arm portion and meshing with the gear teeth of said pinion, a transmission member having a first end pivotably coupled to said rotary member at a location offset from the center of rotation of said rotary member and a second end pivotably coupled to said pinion at the center of rotation of said pinion so as to convert the rotary motion of said rotary member into a linear motion of said pinion, and a second rack on said first arm portion and meshing with the gear teeth of said pinion, whereby said second arm portion is movable over a distance toward and then away from said first arm portion.

7. A crank mechanism as claimed in claim 2, and further comprising a pedal having a shaft rotatably mounted to a free end of said second arm portion, and wherein said transmission means includes a gear fixed to said shaft, and said rotary member is a gear meshing with and having the same effective diameter as the gear of said transmission means.

8. A crank mechanism as claimed in claim 1, wherein said first motion transmitting component of said motion converting means comprises a pinion mounted on said second arm portion so as to be rotatable relative to and movable longitudinally of said second arm portion, said pinion having gear teeth on its circumference, and said second motion transmitting component of said motion converting means comprises a first rack located on said second arm portion and meshing with the gear teeth of said pinion, a transmission member having a first end pivotably coupled to said rotary member at a location offset from the center of rotation of said rotary member and a second end pivotably coupled to said pinion at the center of rotation of said pinion so as to convert the rotary motion of said rotary member into a linear motion of said pinion, and a second rack on said first arm portion and meshing with the gear teeth of said pinion, whereby said second arm portion is movable over a distance toward and then away from said first arm portion.

9. A crank mechanism as claimed in claim 8, wherein said transmission means comprises a non-rotatable shaft through which said rotary shaft extends, a fixed transmission member secured to one end of said non-rotatable shaft, and means for couppling said rotary member to said fixed transmission member in such a manner that said means for coupling rotates said rotary member as said crank arm is turned about the longitudinal axis of said rotary shaft.

10. A crank mechanism as claimed in claim 8, and further comprising a pedal having a shaft rotatably mounted to a free end of said second arm portion, and wherein said transmission means includes a gear fixed to said shaft, and said rotary member is a gear meshing with and having the same effective diameter as the gear of said transmission means.

11. A crank mechanism as claimed in claim 1, and further comprising means for changing the relative position between said motion converting means and said second arm portion of said crank arm while said crank arm is rotationally stationary.

12. A crank mechanism as claimed in claim 11, wherein said motion converting means includes a connecting member connecting said rotary body to said second arm portion, said connecting member being connected to said rotary member at a point offset from the center of rotation of said rotary member.

13. A crank mechanism as claimed in claim 11, wherein said first motion transmitting component of said motion converting means comprises a pinion mounted on said second arm portion so as to be rotatable relative to and movable longitudinally of said second arm portion, said pinion having gear teeth on its circumference, and said second motion transmitting component of said motion converting means comprises a first rack located on said second arm portion and meshing with the gear teeth of said pinion, a transmission member having a first end pivotably coupled to said rotary member at a location offset from the center of rotation of said rotary member and a second end pivotably coupled to said pinion at the center of rotation of said pinion so as to convert the rotary motion of said rotary member into a linear motion of said pinion, and a second rack on said first arm portion and meshing with the gear teeth of said pinion, whereby said second arm portion is movable over a distance toward and then away from said first arm portion.

14. A crank mechanism as claimed in claim 11, wherein said motion converting means comprises a pinion integrated with said rotary member so as to rotate therewith, and two racks extending along said second arm portion on opposite sides of said pinion, respectively, said pinion having gear teeth on at least part of its circumference, said gear teeth being in engagement with one of said racks while said crank arm is rotating a first half turn about said longitudinal axis and with the other of said racks while said crank arm is rotating the second half turn that follows said first half turn.

15. A crank mechanism as claimed in claim 11, and further comprising a pedal having a shaft rotatably mounted to a free end of said second arm portion, and wherein said transmission means includes a gear fixed to said shaft, and said rotary member is a gear meshing with and having the same effective diameter as the gear of said transmission means.

16. A crank mechanism as claimed in claim 1, wherein said motion converting means comprises a pinion integrated with said rotary member so as to rotate therewith, and two racks extending along said second arm portion on opposite sides of said pinion, respectively, said pinion having gear teeth on at least part of its circumference, said gear teeth being in engagement with one of said racks while said crank arm is rotating a first half turn about said longitudinal axis and with the other of said racks while said crank arm is rotating the second half turn that follows said first half turn.

17. A crank mechanism as claimed in claim 1, wherein said transmission means comprises a non-rotatable shaft through which said rotary shaft extends, a fixed transmission member secured to one end of said non-rotatable shaft, and means for coupling said rotary member to said fixed transmission member in such a manner that said means for coupling rotates said rotary member as said crank arm is turned about the longitudinal axis of said rotary shaft.

18. A crank mechanism as claimed in claim 1, and further comprising a pedal having a shaft rotatably mounted to a free end of said second arm portion, and wherein said transmission means includes a gear fixed to said shaft, and said rotary member is a gear meshing with and having the same effective diameter as the gear of said transmission means.

19. A crank mechanism as claimed in claim 1, wherein said motion converting means includes a connecting member connecting said rotary body to said second arm portion, said connecting member being connected to said rotary member at a point offset from the center of rotation of said rotary member.

* * * * *